United States Patent
Wakamiya

(10) Patent No.: US 9,183,060 B2
(45) Date of Paten: Nov. 10, 2015

(54) COMPUTER PRODUCT, MIGRATION EXECUTING APPARATUS, AND MIGRATION METHOD

(75) Inventor: Kenji Wakamiya, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 249 days.

(21) Appl. No.: 13/517,660

(22) Filed: Jun. 14, 2012

(65) Prior Publication Data

US 2013/0041977 A1 Feb. 14, 2013

(30) Foreign Application Priority Data

Aug. 11, 2011 (JP) ................................ 2011-176349

(51) Int. Cl.
| | |
|---|---|
| *G06F 15/16* | (2006.01) |
| *G06F 9/50* | (2006.01) |
| *G06F 9/455* | (2006.01) |
| *G06F 3/06* | (2006.01) |

(52) U.S. Cl.
CPC .......... *G06F 9/5077* (2013.01); *G06F 9/45558* (2013.01); *G06F 3/0647* (2013.01); *G06F 2009/4557* (2013.01)

(58) Field of Classification Search
CPC ... H04L 49/70; H04L 29/08153; H04L 47/70; H04L 47/781; H04L 67/1095; H04L 67/1002
USPC ................ 709/217, 218–222, 223, 224, 226; 718/1, 102, 104, 105; 711/147–149, 711/154–162
See application file for complete search history.

(56) References Cited

U.S. PATENT DOCUMENTS

| | | | |
|---|---|---|---|
| 8,156,490 B2 * | 4/2012 | Bozek et al. ...................... 718/1 |
| 8,230,204 B2 * | 7/2012 | Rostampour .................... 713/1 |
| 8,291,411 B2 * | 10/2012 | Beaty et al. ....................... 718/1 |
| 8,386,731 B2 * | 2/2013 | Mashtizadeh et al. ......... 711/162 |
| 8,521,685 B1 * | 8/2013 | Chatterjee et al. ............. 707/609 |
| 2005/0268298 A1 * | 12/2005 | Hunt et al. ........................ 718/1 |
| 2008/0027950 A1 | 1/2008 | Fukumi |

(Continued)

FOREIGN PATENT DOCUMENTS

| | | |
|---|---|---|
| JP | 2006-127040 A | 5/2006 |
| JP | 2008-033483 A | 2/2008 |

(Continued)

OTHER PUBLICATIONS

Japanese Office Action mailed Dec. 2, 2014 for corresponding Japanese Patent Application No. 2011-176349, with Partial English Translation, 3 pages.

*Primary Examiner* — Ruolei Zong
(74) *Attorney, Agent, or Firm* — Fujitsu Patent Center

(57) ABSTRACT

A computer-readable medium stores therein a migration executing program stored in a second storage area that is different from a first storage area where a first operating system (OS) is stored. The migration executing program causes a source apparatus to execute a process. The process includes detecting the presence of the first operating system in the first storage area when the source apparatus that includes the first and second storage areas is started up by a second OS stored in the second storage area; and transferring, when the presence of the first operating system in the first storage area is detected, data to be migrated that are stored in the first storage area and include at least the first operating system to a destination apparatus that can communicate with the source apparatus.

1 Claim, 13 Drawing Sheets

(56) References Cited

U.S. PATENT DOCUMENTS

| | | |
|---|---|---|
| 2008/0028402 A1 | 1/2008 | Senoo |
| 2008/0222375 A1* | 9/2008 | Kotsovinos et al. .......... 711/162 |
| 2010/0115512 A1* | 5/2010 | Sakai ............................... 718/1 |
| 2011/0145816 A1 | 6/2011 | Glikson et al. |

FOREIGN PATENT DOCUMENTS

| | | |
|---|---|---|
| JP | 2008-033500 A | 2/2008 |
| JP | 2009-122963 A | 6/2009 |
| JP | 2011-123891 A | 6/2011 |

* cited by examiner

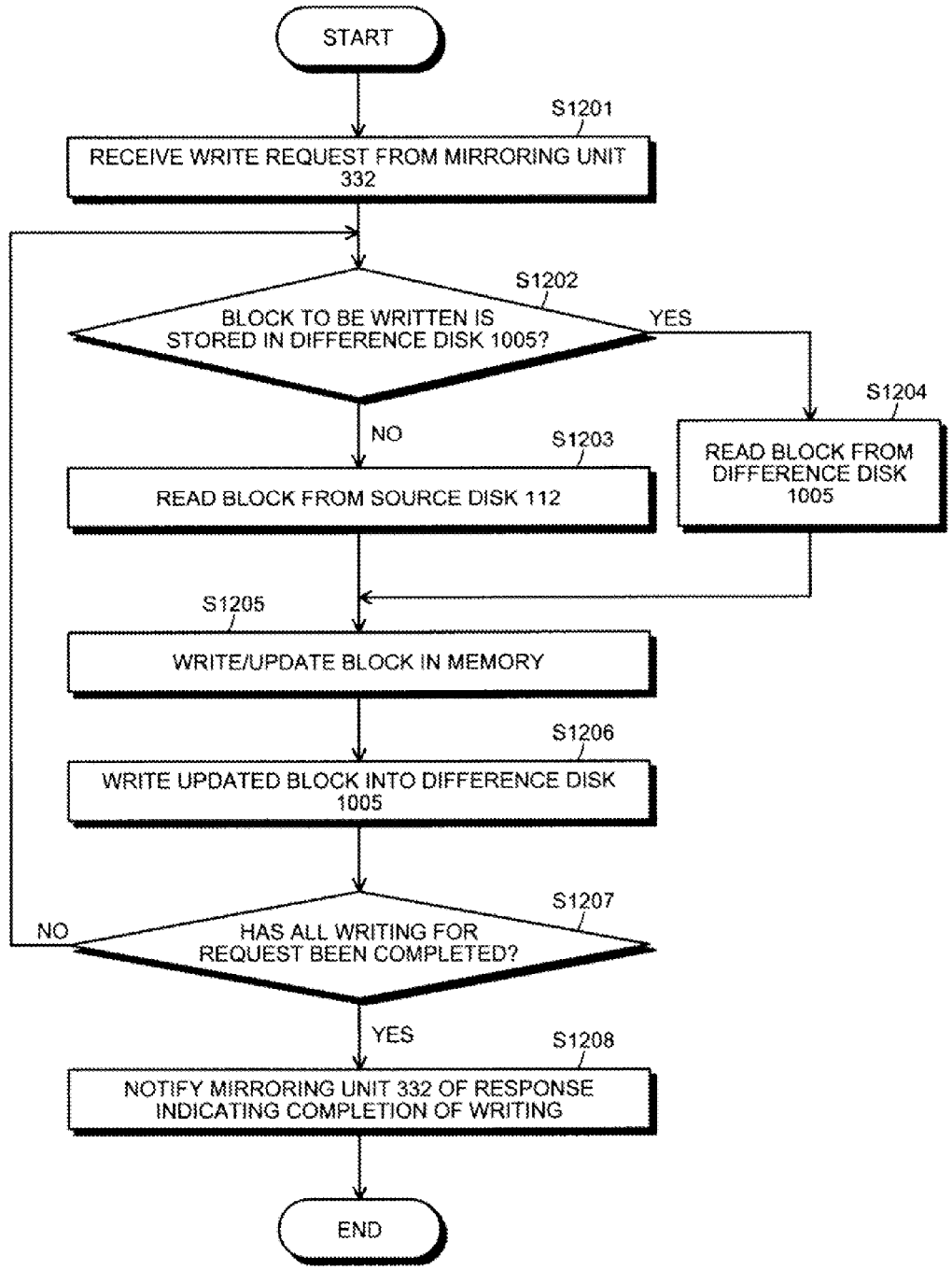

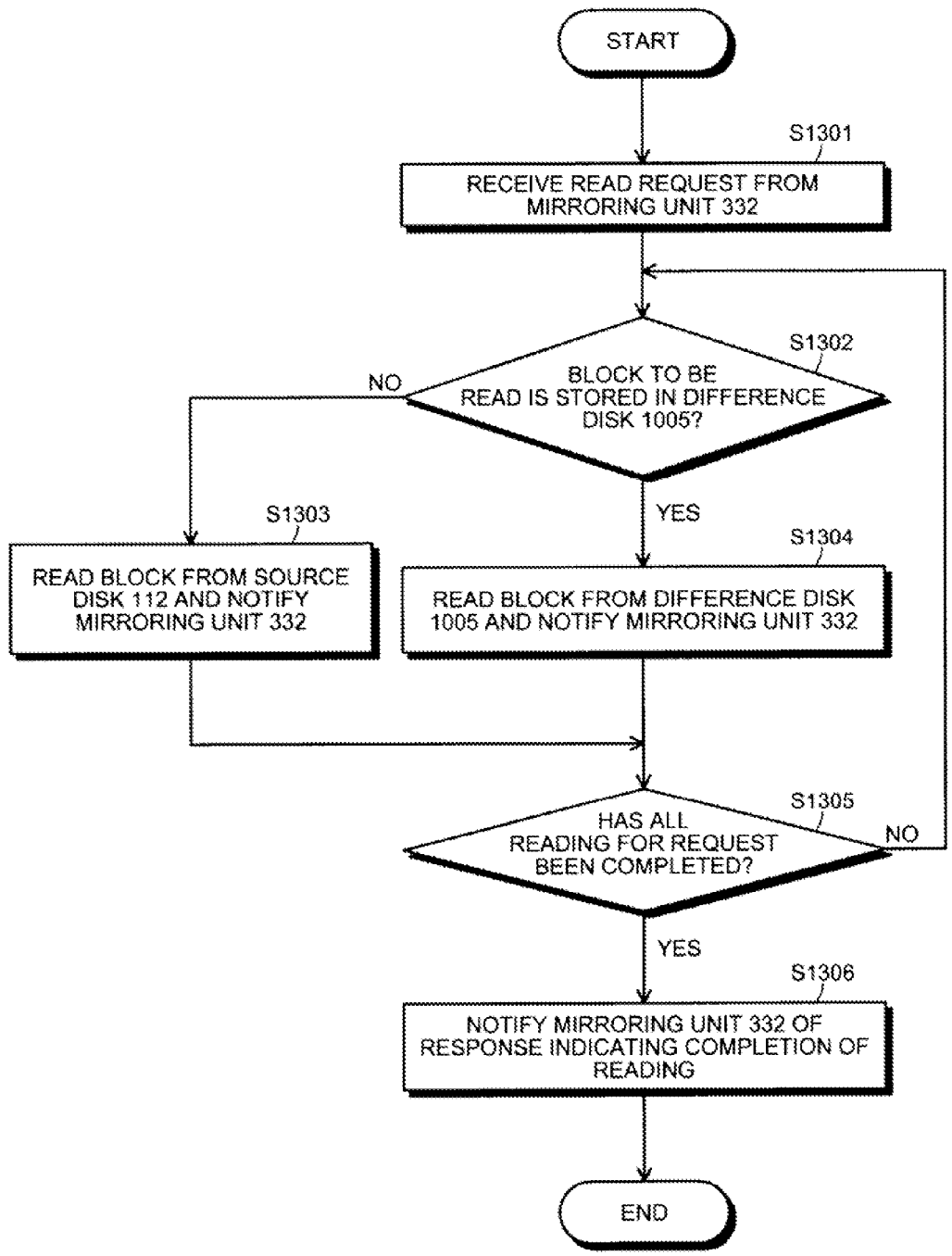

COMPUTER PRODUCT, MIGRATION EXECUTING APPARATUS, AND MIGRATION METHOD

CROSS REFERENCE TO RELATED APPLICATIONS

This application is based upon and claims the benefit of priority of the prior Japanese Patent Application No. 2011-176349, filed on Aug. 11, 2011, the entire contents of which are incorporated herein by reference.

FIELD

The embodiments discussed herein are related to migration for computer environment.

BACKGROUND

Conventionally, an existing computer environment may be migrated to a different computer environment for performance improvement, load distribution, and/or maintenance. The computer environment may be a real computer environment or a virtual computer environment executed by a virtual machine (VM) monitor. In the migration of the computer environment, data on a disk of a source computer environment are copied to a disk of a destination computer environment.

As a copying technology, postcopy is disclosed that enables data on the source environment to be referred to from the destination environment transparently as if the data are at hand, and when data that have not yet been copied to the destination are referred to, copies the data from the source to the destination.

For example, Japanese Laid-Open Patent Publication Nos. 2008-33500 and 2008-33483 disclose a technology for migration of computer environment using postcopy in which a module that controls postcopy of data divides data to be migrated into first data used at the start-up of an operating system (OS) and remaining second data.

The module migrates the first data to the destination computer environment where the OS is started up using the copied first data to resume the execution of a task. If the OS on the destination requires a part of the second data that has not yet been copied, the module copies the data on an on-demand basis as well as copying the second data in background, thereby migrating the computer environment.

However, the conventional technology described above assumes that the destination computer environment/VM monitor includes a module for postcopy in advance. Thus, migration using postcopy is difficult for an existing computer environment that does not include the module for postcopy.

SUMMARY

According to an aspect of an embodiment, a computer-readable medium stores therein a migration executing program stored in a second storage area that is different from a first storage area where a first operating system (OS) is stored. The migration executing program causes a source apparatus to execute a process. The process includes detecting the presence of the first operating system in the first storage area when the source apparatus that includes the first and second storage areas is started up by a second OS stored in the second storage area; and transferring, when the presence of the first operating system in the first storage area is detected, data to be migrated that are stored in the first storage area and include at least the first operating system to a destination apparatus that can communicate with the source apparatus.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 12 is a flowchart of an example of a write process executed by the copy-on-write unit 1004.

FIG. 13 is a flowchart of an example of a read process executed by the copy-on-write unit 1004.

DESCRIPTION OF EMBODIMENTS

Preferred embodiments of a migration executing program, a migration executing apparatus, and a migration method disclosed herein are described in detail below with reference to the accompanying drawings.

Figure 1:
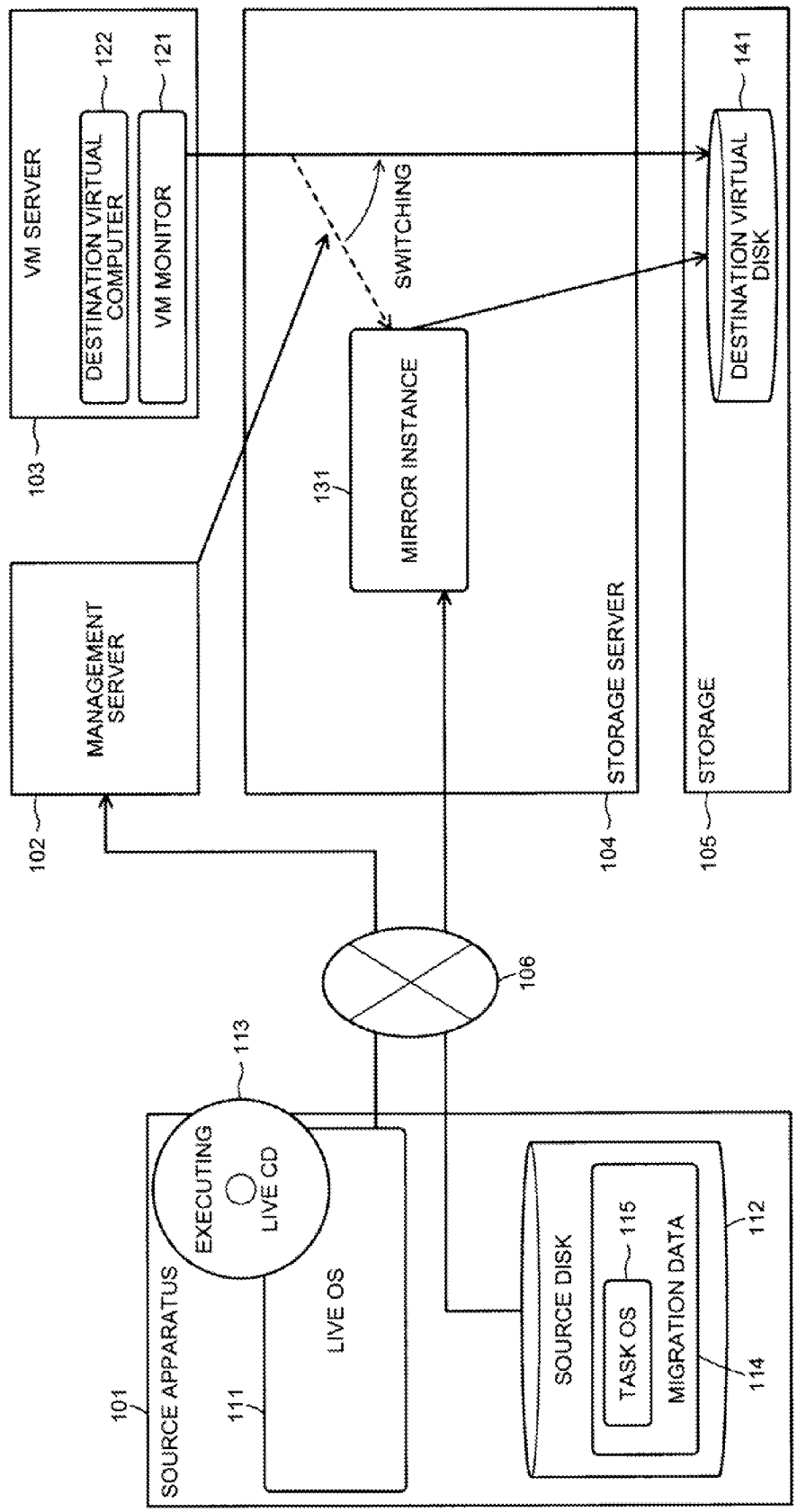
FIG. 1 is a schematic of an example of a migration process executed by a migration system 100 according to a first embodiment.

FIG. 1 is a schematic of an example of a migration process executed by a migration system 100 according to a first embodiment. The migration system 100 for migration of computer environment includes a source apparatus 101, a management server 102, a virtual machine (VM) server 103, a storage server 104, and a storage 105 that are connected via a network 106. The migration system 100 according to the present embodiment is described as physical to virtual (P2V) where the source computer environment is physical and the destination computer environment is virtual.

The source apparatus 101 (i.e., the source computer environment) includes a live OS 111 and a source disk 112 that includes data 114 to be migrated (hereinafter, "migration data 114") that include a task OS 115 executed on the source computer environment. The live OS 111 is started up from a migration executing program live CD 113 temporarily for migration.

The management server 102 manages the operation of apparatuses on the destination side in the migration process. The VM server 103 includes a destination virtual computer 122 (i.e., the destination computer environment) and a virtual machine (VM) monitor 121 that executes the destination virtual computer 122. The storage server 104 manages the storage 105, and starts up a general mirroring tool. In the following description, an entity developed in a memory of the storage server 104 by the general mirroring tool is called a mirror instance 131 details of which are described later with reference to FIG. 3. The storage 105 includes a destination virtual disk 141 functioning as a storage of the destination virtual computer 122.

When the source apparatus 101 is started up, the live OS 111 detects the presence of the task OS 115 on the source disk 112, and starts to transfer the migration data 114 stored in the source disk 112 and including at least the task OS 115 to the storage server 104. The mirror instance 131 that receives the data performs mirroring between a source storage area of the source disk 112 where the migration data 114 are stored and a destination storage area of the destination virtual disk 141 where the migration data 114 are to be stored. The management server 102 causes the VM server 103 to create and start up the destination virtual computer 122 where the task OS 115 being copied to the destination virtual disk 141 is executed.

In the mirroring, the storage server 104 notifies the mirror instance 131 of an access request to the migration data 114 issued from the task OS 115 executed on the destination virtual computer 122. After the completion of the mirroring, the storage server 104 switches the destination of the access request from the mirror instance 131 to the destination virtual disk 141.

Thus, the migration system 100 starts up the source apparatus 101 from the migration executing program live CD 113 that includes a module for enabling postcopy, and executes a migration process to the storage server 104 that seems to be a mere storage device from the outside, thereby enabling migration without change to an existing computer environment even when the computer environment to be migrated, the destination computer, and/or the VM monitor do not include the migration module.

The migration system 100 according to the present embodiment is described as P2V; however, the migration system 100 may be virtual to virtual (V2V) where the source computer environment is virtual. In this case, the source apparatus 101 includes a VM monitor, and the source computer environment that executes the task OS 115 is one of virtual computers executed by the VM monitor.

When the migration system 100 is V2V, a virtual computer B (not depicted) executes the live OS 111 and migrates the virtual computer that executes the task OS 115 to be migrated. The live OS 111 executed by the virtual computer B may be included in a virtual disk of the source disk 112 of the source apparatus 101 accessible to the virtual computer B, instead of being started up from the migration executing program live CD 113.

Figure 2:
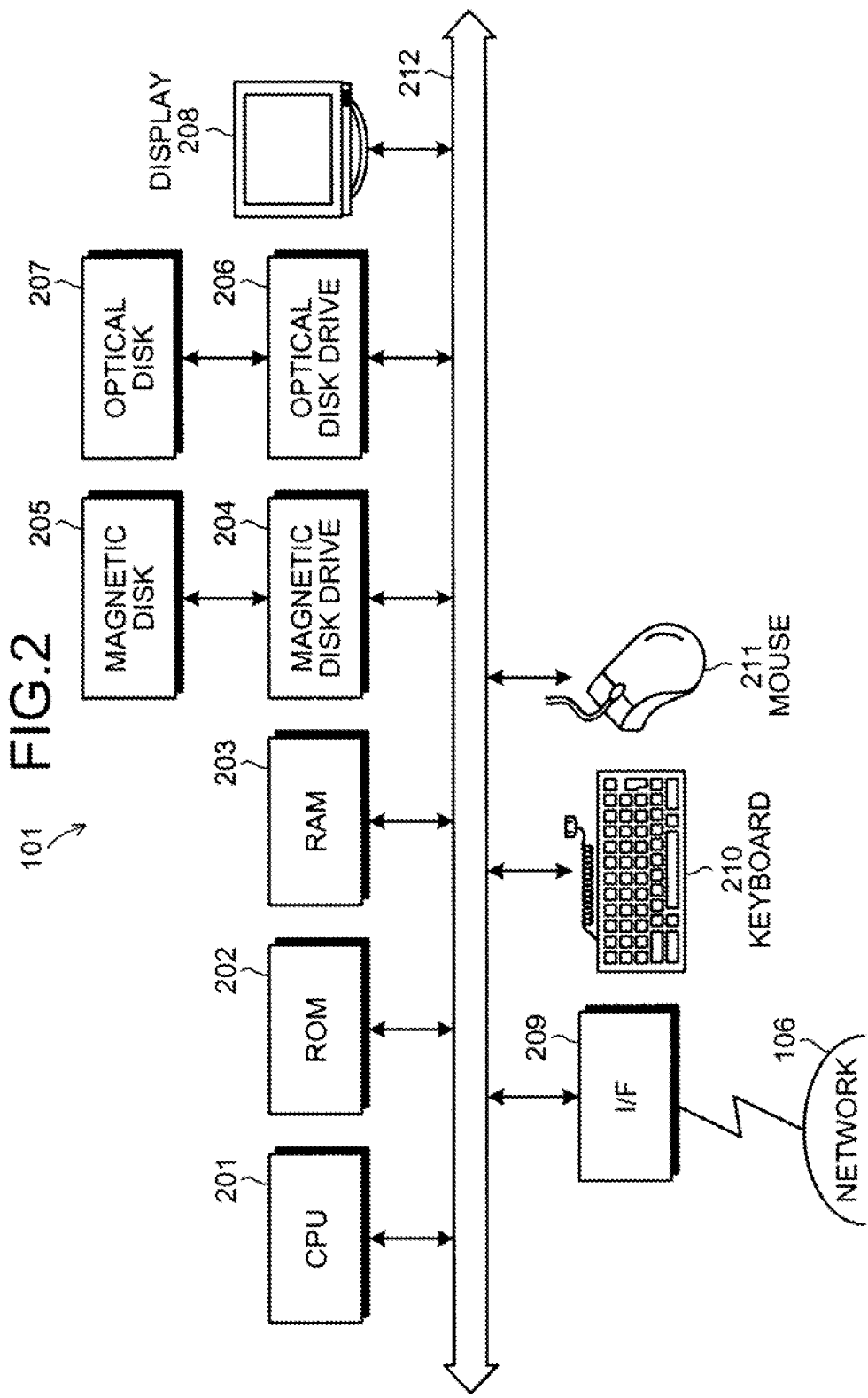
FIG. 2 is a hardware block diagram of a source apparatus 101 according to the first and second embodiments.

FIG. 2 is a hardware block diagram of the source apparatus 101 according to the first and second embodiments. The management server 102, the VM server 103, and the storage server 104 include hardware similar to that of the source apparatus 101, and thus description thereof is omitted. As depicted in FIG. 2, the source apparatus 101 includes a central processing unit (CPU) 201, a read-only memory (ROM) 202, and a random access memory (RAM) 203.

The source apparatus 101 includes a magnetic disk drive 204, a magnetic disk 205, an optical disk drive 206, and an optical disk 207 as storage devices. The source apparatus 101 includes a display 208, an interface (I/F) 209, a keyboard 210, and a mouse 211 as input/output devices for a user and other devices. These units are connected by a bus 212.

The CPU 201 governs overall control of the source apparatus 101. The ROM 202 stores therein programs such as a boot program. The RAM 203 is used as a work area of the CPU 201. The magnetic disk drive 204, under the control of the CPU 201, controls the reading and writing of data with respect to the magnetic disk 205. The magnetic disk 205 stores therein data written under control of the magnetic disk drive 204.

The optical disk drive 206, under the control of the CPU 201, controls the reading and writing of data with respect to the optical disk 207. The optical disk 207 stores therein data written under control of the optical disk drive 206, the data being read by a computer.

The display 208 displays data such as text, images, functional information, etc., in addition to a cursor, icons, and/or tool boxes. A cathode ray tube (CRT), a liquid crystal display, a plasma display, etc., may be employed as the display 208.

The I/F 209 is connected to the network 106 such as the local area network (LAN), the wide area network (WAN), and the Internet, and to other apparatuses through the network 106. The I/F 209 administers an internal interface with the network 106 and controls the input/output of data from/to external apparatuses. For example, a modem or a LAN adapter may be employed as the I/F 209.

The keyboard 210 includes keys for inputting letters, numerals, and various instructions and performs the input of data. Alternatively, a touch-panel-type input pad or numeric keypad, etc. may be adopted. The mouse 211 is used to move the cursor, select a region, or move and change the size of windows. Alternatively, the source apparatus 101 may include a track ball or a joy stick provided each respectively has a function similar to a pointing device. The source apparatus 101 may not include the display 203, the keyboard 210, and the mouse 211 functioning as user interface if the source apparatus 101 is not directly manipulated by a user.

Figure 3:
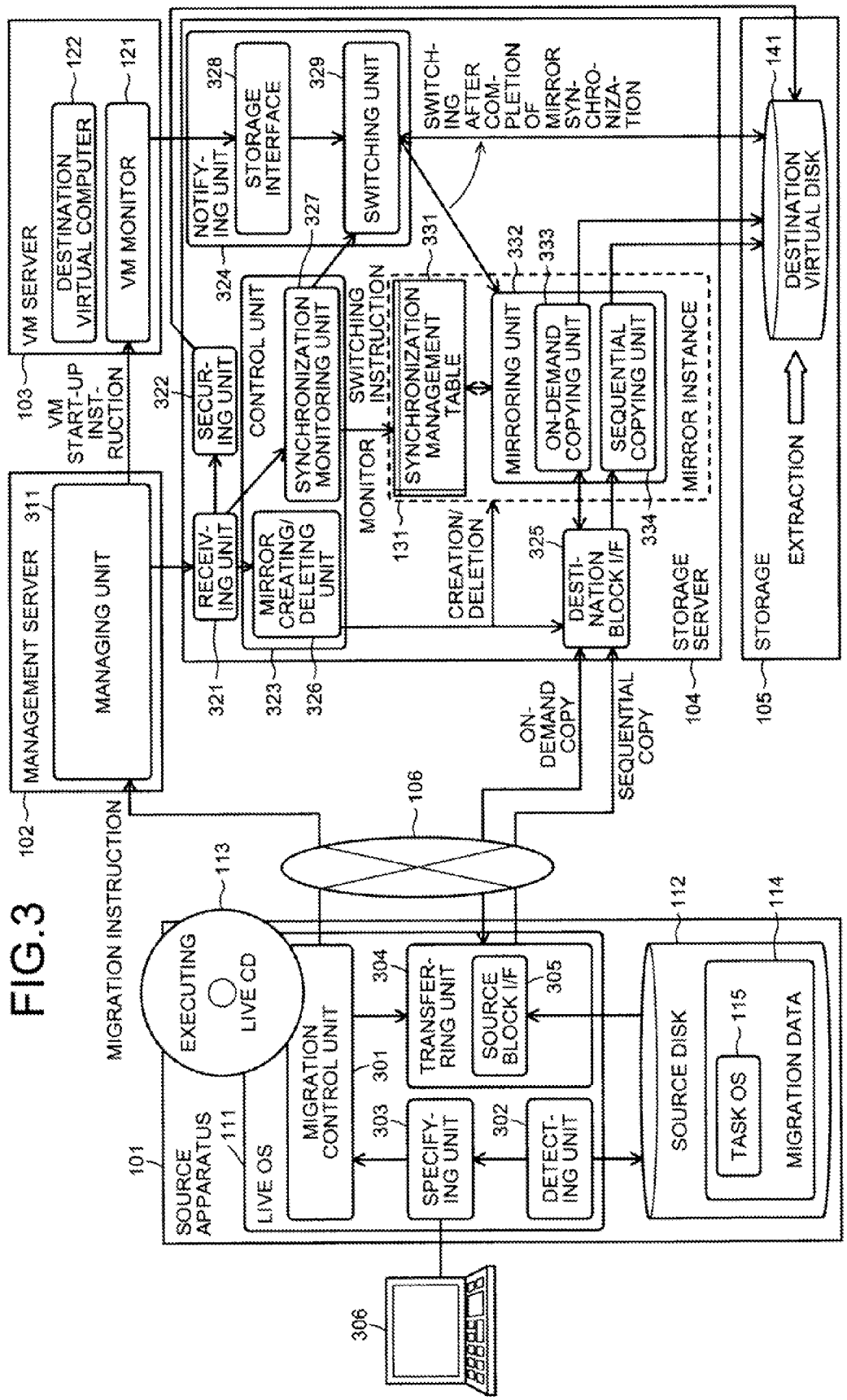
FIG. 3 is a functional block diagram of the migration system 100 according to the first embodiment.

FIG. 3 is a functional block diagram of the migration system 100 according to the first embodiment. The source apparatus 101 includes the live OS 111, a migration control unit 301, a detecting unit 302, a specifying unit 303, and a transferring unit 304 that includes a source block I/F 305. The source apparatus 101 is connected to a specifying terminal 306. These functions (i.e., the migration control unit 301 to the transferring unit 304) as control units are implemented by the CPU 201 executing a program stored in the migration executing program live CD 113.

The management server 102 includes a managing unit 311 implemented by the CPU of the management server 102 executing a program stored in a storage device of the management server 102 such as the ROM, the RAM, the magnetic disk, and the optical disk of the management server 102. Alternatively, functions of the management server 102 may be implemented by another CPU connected through the I/F.

The VM server 103 includes the VM monitor 121 and the destination virtual computer 122. The storage server 104 includes a receiving unit (receiver) 321, a securing unit (securer) 322, a control unit (controller) 323, a notifying unit 324, a destination block I/F 325, and the mirror instance 131. The control unit 323 includes a mirror creating/deleting unit 326 and a synchronization monitoring unit 327. The notifying unit 324 includes a storage interface 328 and a switching unit 329.

Functions of the receiving unit 321 to the destination block I/F 325 and the mirror instance 131 are implemented by the CPU of the storage server 104 executing a program stored in a storage device of the storage server 104 such as the ROM, the RAM, the magnetic disk, the optical disk of the storage server 104, and the storage 105. Alternatively, these functions may be implemented by another CPU connected through the I/F of the storage server 104.

The mirror instance 131 includes a synchronization management table 331 and a mirroring unit (mirroring device) 332 that includes an on-demand copying unit 333 and a sequential copying unit 334. The migration system 100 includes, as storage areas accessible to software depicted in FIG. 3, the source disk 112 in the source apparatus 101 and the destination virtual disk 141 in the storage 105. The storage 105 may be included in the storage server 104.

The migration executing program according to the first embodiment is stored in a second storage area that is different from a first storage area where a first OS is stored. For example, the task OS 115 (i.e., the first OS) is stored in the magnetic disk 205 (i.e., the first storage area), and the migration executing program is stored in the optical disk 207 (i.e., the second storage area).

Alternatively, if the migration system 100 is V2V, the task OS 115 is stored in a virtual disk for which a given logical unit number (LUN) is set among storage areas of the magnetic disk 205, and the migration executing program is stored in another virtual disk for which a different LUN is set. As described above, the first and second storage areas are physically different storage mediums if the migration system 100 is P2V. If the migration system 100 is V2V, the first and second storage areas may be physically different storage mediums, or physically the same but logically different storage mediums having different LUNs.

The migration control unit 301 controls the source side in the migration process. Specifically, the migration control unit 301 creates the source block I/F 305 after notifying the managing unit 311 of a preparation instruction of the migration process. The migration control unit 301 may be a module of the live OS 111, or an application software (hereinafter, "application") executable on the live OS 111.

The detecting unit 302 detects the presence of the first OS on the first storage area when the source apparatus 101 that includes the first and second storage areas is started up by the second OS stored in the second storage area. For example, the detecting unit 302 detects the presence of the task OS 115 on the magnetic disk 205 (i.e., the first storage area) by acquiring the master boot record (MBR) that is the first sector of the magnetic disk 205, detecting partitions described in the MBR, and detecting a partition for which the boot identifier is set to an active partition from the detected partitions.

The detecting unit 302 may detect a state in which the storage area(s) of the source apparatus 101, excluding the second storage area, is the first storage area when the source apparatus is started up by the second OS. The detecting unit 302 further detects tips information from the detected partitions. The detected partitions and tips information are notified to the specifying terminal 306 and stored in a storage area such as a register of the CPU 201 and the RAM 203.

The tips information provides tips when the migration data 114 are specified by the specifying unit 303. For example, the tips information indicates for which OS each partition is made and may include, for example, the number of blocks and/or the size (bite) of the partition.

The specifying unit 303 specifies the migration data 114 from the detected partitions. Specifically, the specifying unit 303 specifies, as the migration data 114, a partition(s) selected by a user from a list of partitions displayed on the specifying terminal 306. Information on the specified partition(s) is stored in a storage area such as a register of the CPU 201 and the RAM 203.

The transferring unit 304 transfers, when the detecting unit 302 detects the presence of the first OS on the first storage area, the migration data 114 stored in the first storage area and including at least the first OS to the destination apparatus that can communicate with the source apparatus 101. In FIG. 3, the destination apparatus is the storage server 104. The migration data 114 may be data specified by the specifying unit 303. The unit of transfer of the migration data 114 may be a file.

Alternatively, the transferring unit 304 may transfer the migration data 114 to the destination apparatus with the unit of transfer of the migration data 114 being set as a block. In this case, the transferring unit 304 creates the source block I/F 305 in the source apparatus 101, and causes the storage server 104 to create the destination block I/F 325 via the migration control unit 301.

The source block I/F 305 accesses the source disk 112 on a block-by-block basis, and communicates with the destination block I/F 325 via the network 106. For example, the source block I/F 305 is software based on the internet SCSI (iSCSI) in which the small computer system interface (SCSI) protocol is used on a transmission control protocol/internet protocol (TCP/IP) network.

The specifying terminal 306 displays the list of the detected partitions on the display, thereby enabling a user to select a partition(s). The specifying terminal 306 may display the detected tips information along with the detected partitions. An example of the display screen will be depicted in FIG. 5. The migration system 100 may not include the specifying terminal 306 and may display the list of the detected partitions on the display 208 of the source apparatus 101. If only one partition is detected or a partition that has been previously booted is always selected according to a fixed rule set in advance, the partition(s) need not to be selected by a user and thus the specifying terminal 306 may be omitted.

The source disk 112 stores therein the task OS 115 included in the migration data 114, a task application(s) executed on the task OS 115, and task data accessible to the task application(s). The source disk 112 may be divided into plural partitions or be plural disks. The task OS 115 and the live OS 111 may be of different types of OS.

The managing unit 311 manages apparatuses on the destination side in the migration process. Upon reception of a migration instruction from the migration control unit 301, the managing unit 311 notifies the VM server 103 of a start-up instruction of the VM and the storage server 104 of a creation instruction of the mirror instance 131.

The VM monitor 121 is software that virtualizes a computer and controls the computer to execute plural OSes. In the example of FIG. 3, the VM monitor 121 executes the destination virtual computer 122 that is a virtual machine. There may be plural virtual computers, although only one virtual computer is executed in the example of FIG. 3.

The destination virtual computer 122 that is computer environment to which the source apparatus 101 is migrated is a virtual computer executed on the VM server 103. For example, the destination virtual computer 122 is software that virtualizes hardware resources of the VM server 103 such as the CPU and the memory, and provides the virtualized environment to software executed on the VM monitor 121.

The receiving unit 321 receives a migration instruction of the migration data 114 from the source apparatus 101 that includes the source storage area where the migration data 114 including the OS to be migrated are stored. For example, the receiving unit 321 receives the migration instruction that includes information on the migration data 114 and information for connection to the source block I/F 305, from the source apparatus 101 via the management server 102. The received migration instruction is stored in a storage area of the storage server 104 such as a register of the CPU, the RAM, and the magnetic disk.

When the migration instruction is received, the securing unit 322 secures, in the storage area(s) of the destination apparatus, the destination storage area accessible to the OS to be migrated. The destination storage area is secured in a storage pool of the storage 105. For example, the securing unit 322 extracts the destination virtual disk 141 for which a new LUN is set from the storage pool of the storage 105. The extracted destination virtual disk 141 becomes the destination storage area accessible to the destination virtual computer 122 that executes the task OS 115.

When the destination storage area is secured by the securing unit 322, the control unit 323 controls the mirroring unit 332 such that the migration data 114 are synchronized between the source storage area and the destination storage area. For example, the control unit 323 sets the source storage area and the destination storage area as command line arguments when the mirror creating/deleting unit 326 creates the mirror instance 131. Thus, the mirroring unit 332 synchronizes two storage areas set as the command line arguments.

When an access request to the migration data 114 is issued by the OS to be migrated during the synchronization by the mirroring unit 332, the notifying unit 324 notifies the mirroring unit 332 of the access request and notifies the OS to be migrated of a response from the mirroring unit 332. For example, the notifying unit 324 notifies the mirroring unit 332 of an access request received by the storage interface 328 from the VM server 103 that executes the OS to be migrated, and notifies the VM server 103 of a response to the access request by the storage interface 328.

The destination block I/F 325 communicates with the source block I/F 305 via the network 106, and is accessed by the mirroring unit 332 on a block-by-block basis.

The mirror creating/deleting unit 326 creates and deletes the mirror instance 131 and the destination block I/F 325. The synchronization monitoring unit 327 monitors the progress of the mirror synchronization. Specifically, the synchronization monitoring unit 327 monitors the synchronization management table 331 to determine whether the mirror synchronization is completed, and notifies the switching unit 329 of a switching instruction after the completion of the mirror synchronization.

The storage interface 328 is an interface for an access from the VM server 103 to the migration data 114. The storage server 104 is accessed by the VM server 103 as if the storage server 104 is a mere storage device.

When the synchronization by the mirroring unit 332 is completed, the switching unit 329 switches, from the mirroring unit 332 to the destination storage area, the destination of the access request to the migration data 114 from the OS to be migrated. Specifically, the switching unit 329 switches the storage mode from a first storage mode in which the storage interface 328 accesses the mirroring unit 332 to a second storage mode in which the storage interface 328 accesses the destination virtual disk 141 of the storage 105, upon reception of the switching instruction from the synchronization monitoring unit 327.

The mirror instance 131 is an entity developed in the memory of the storage server 104 by a general mirroring tool. For example, contents developed in the memory include the execution code of the mirroring tool, values of register variables of the CPU of the storage server 104, and data accessible to the execution code. A part of the execution code is the mirroring unit 332, and a part of the data accessible to the execution code is the synchronization management table 331. The general mirroring tool is, for example, device mapper usually bundled with Linux (registered trademark).

The synchronization management table 331 manages the progress of the mirroring performed by the general mirroring tool for each block. Details of the synchronization management table 331 are described later with reference to FIG. 4.

The mirroring unit 332 has a function for postcopy, and upon reception of the access request from the VM server 103, determines whether data to be accessed are stored in the destination virtual disk 141 and responds to the access request according to the result of the determination.

If the data to be accessed are stored in the destination virtual disk 141, the mirroring unit 332 responds to the access request from the VM server 103 by accessing the destination virtual disk 141. On the other hand, if the data are not stored in the destination virtual disk 141, the mirroring unit 332 responds to the access request by accessing the source disk 112 by the on-demand copying unit 333. The mirroring unit 332 also copies the migration data 114 on the source disk 112 sequentially to the destination virtual disk 141 by the sequential copying unit 334.

The destination virtual disk 141 stores the migration data 114, and is extracted as one virtual disk having a new LUN from the storage pool configured by physical disks in the storage 105. Alternatively, the destination virtual disk 141 may be one physical disk.

In the migration system 100 having the functions described above, after the task OS 115 is shut down, the source apparatus 101 started up from the live OS 111 in the migration executing program live CD 113 creates the source block I/F 305 by the migration control unit 301, and notifies the management server 102 of a migration instruction to the destination virtual computer 122.

The management server 102 that receives the migration instruction instructs the VM server 103 to start up the destination virtual computer 122, and starts the mirror synchronization at the same time. Unlikely to the conventional technology, the destination virtual computer 122 can start up the task OS 115 at this point of time without waiting for the completion of copying of the first data, thereby reducing the time for which a task is halted. After the completion of the mirror synchronization, the management server 102 switches the storage mode by the switching unit 329, thereby ending the migration process.

Figure 4:
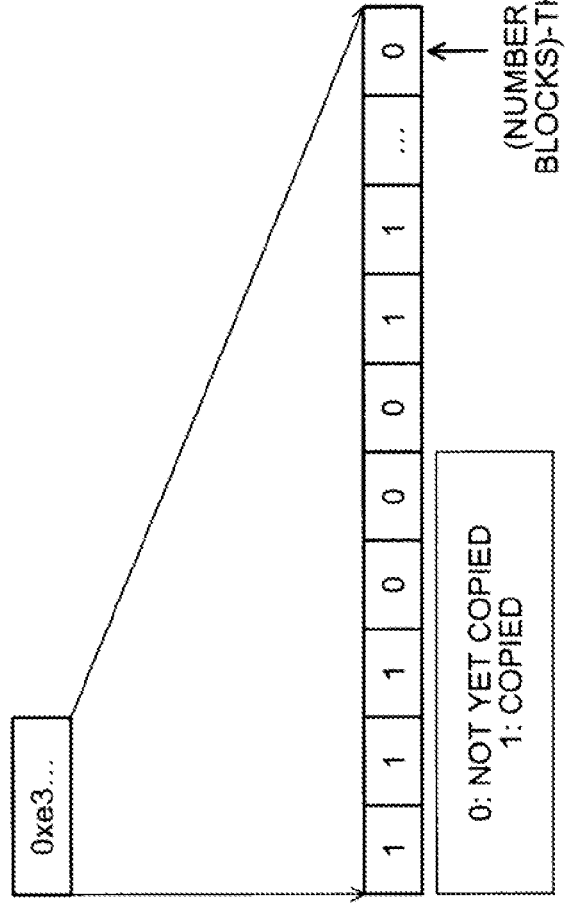
FIG. 4 is a schematic of an example of contents of a synchronization management table 331.

FIG. 4 is a schematic of an example of contents of the synchronization management table 331. A sign 401 indicates the contents of the synchronization management table 331 that stores for each block whether the block has been copied. The synchronization management table 331 includes two fields, namely a block number field for the number of each block from the top of the data to be migrated, and a copy flag field for an identifier indicating whether the block has been copied, such as "NOT YET COPIED" and "COPIED".

The synchronization management table 331 indicated by the sign 401 indicates that, if the block size is 512 bytes, the 0th to 1536th bytes of the 0th to 2nd blocks and the 3072nd to 4095th bytes of the 6th and 7th blocks have been copied. For example, the sign 401 indicates a state after the top 0th to 2nd blocks have been copied by the sequential copying unit 334 and the 6th and 7th blocks have been copied by the on-demand copying unit 333 in response to an access request from the VM server 103.

The contents of the synchronization management table 331 can be represented by a bit sequence, since the block number field stores a sequence of numbers starting from 0 and increasing by 1 and the copy flag is binary as described above.

A sign 402 indicates an example of implementation of the synchronization management table 331 indicated by the sign 401 in a storage area.

For example, the storage server 104 reads a byte sequence "0xe3 . . . " in the storage area as a bit sequence "11100011 . . . 0", and determines that a block corresponding to the bit 0 has not yet copied and a block corresponding to the bit 1 has been copied. For example, the storage server 104 determines that the blocks of the block numbers 0 to 2 have been copied since each of the top three bits of the bit sequence is 1.

Figure 5:
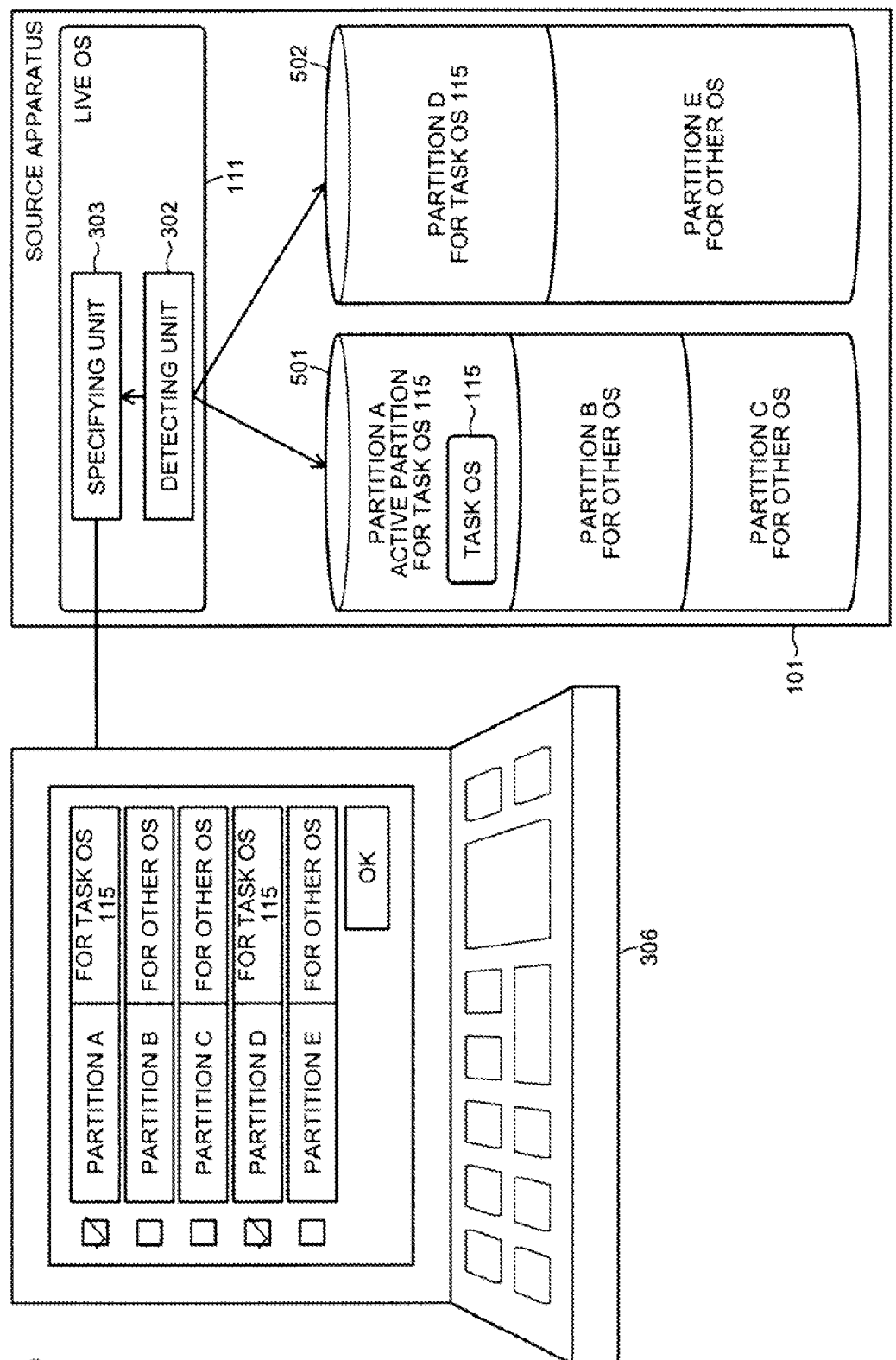
FIG. 5 is a schematic of an example of the type of partition and an example of a display screen on a specifying terminal 306.

FIG. 5 is a schematic of an example of the type of partition and an example of a display screen on the specifying terminal 306. It is assumed in FIG. 5 that the source disk 112 includes a disk 501 divided into three partitions A, B, and C and a disk 502 divided into two partitions D and E. The partitions A and D are used by the task OS 115, and the partitions B, C, and E are used by another OS(es). The partition A is set as an active partition.

The detecting unit 302 detects the disks 501 and 502 and the partitions A to E in the disks 501 and 502. The detecting unit 302 reads the boot identifier of the MBR, and detects the presence of the task OS 115 since the partition A is the active partition. The detecting unit 302 further detects information on the OS(es) for which the partitions A to E are used as the tips information.

The specifying terminal 306 displays the detected partitions and the tips information. In FIG. 5, the partition A where the task OS 115 is present and the partition D used by the task OS 115 are selected. If the specifying terminal 306 receives the pressing of OK button in this state, the specifying unit 303 specifies the partitions A and D among the partitions A to E as the migration data 114. The amount of data to be migrated can be reduced by specifying the migration data 114 from the source disk 112.

Figure 6:
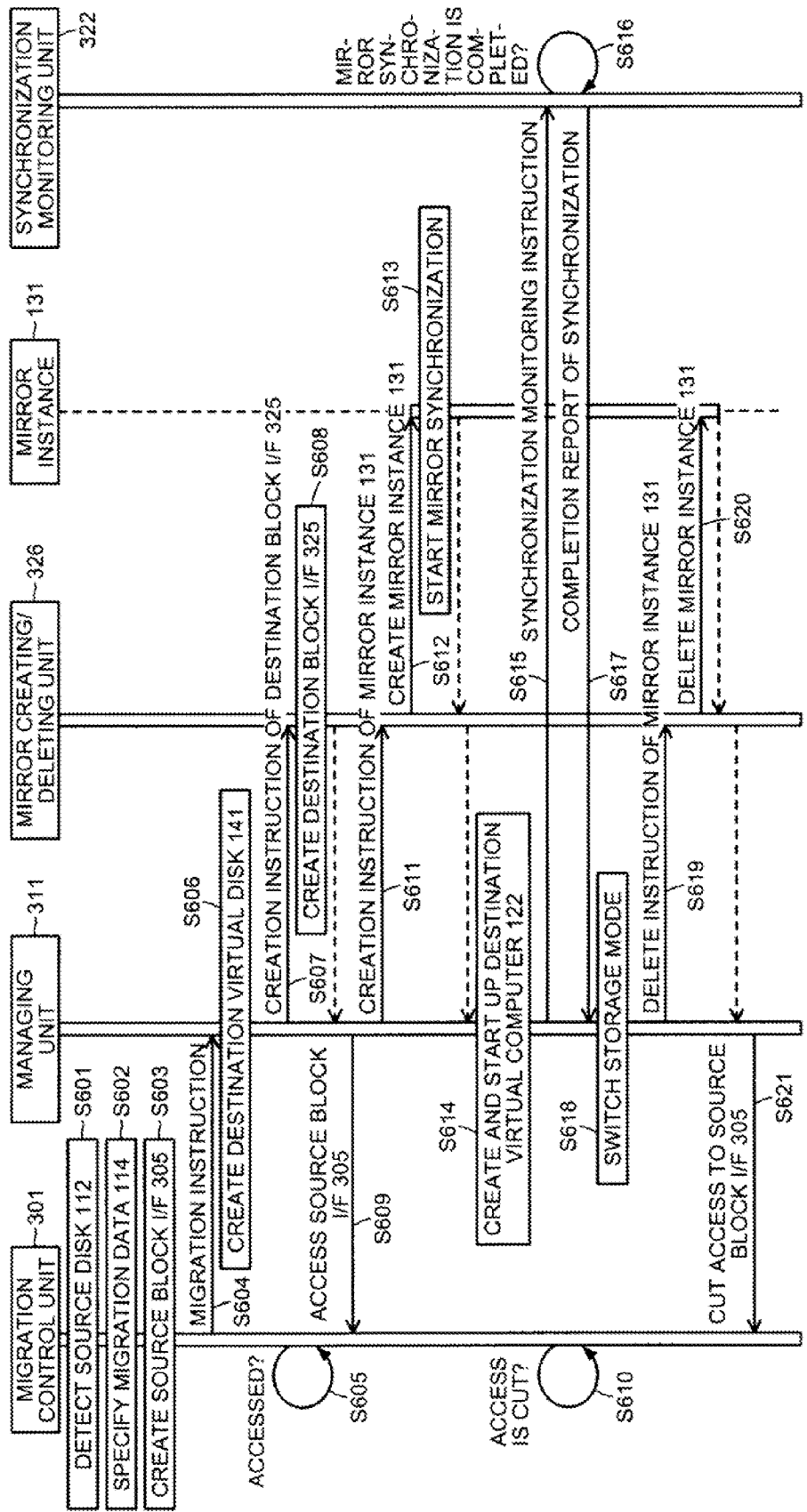
FIG. 6 is a sequence diagram of the migration process executed by the migration system 100.

FIG. 6 is a sequence diagram of the migration process executed by the migration system 100. The migration control unit 301 detects the source disk 112 (step S601), specifies the migration data 114 (step S602), creates the source block I/F 305 (step S603), and notifies the managing unit 311 of a migration instruction requesting an execution of the migration process and including the information on the migration data 114 and the information for connection to the source block I/F 305 (step S604).

The information on the migration data 114 includes, for example, the number of blocks of the migration data 114. The information for connection to the source block I/F 305 includes, for example, the IP address, the TCP port number, and the iSCSI name of the source apparatus 101 if the source block I/F 305 and the destination block I/F 325 are based on the iSCSI protocol. After the notification, the migration control unit 301 keeps checking until the source block I/F 305 is accessed (step S605).

The managing unit 311 that receives the migration instruction creates the destination virtual disk 141 (step S606). For example, the destination virtual disk 141 is a disk for which a new LUN is set among the disks in the storage 105, and has more blocks than the number of blocks of the migration data 114 notified in the migration instruction.

After the creation, the managing unit 311 notifies the mirror creating/deleting unit 326 of a creation instruction of the destination block I/F 325 (step S607). The mirror creating/deleting unit 326 that receives the creation instruction creates the destination block I/F 325 (step S608) and notifies the managing unit 311 of the result of the creation. The managing unit 311 that receives the result accesses the source block I/F 305 (step S609). During the access, the migration control unit 301 keeps checking whether the access to the source block I/F 305 is cut (step S610).

After accessing the source block I/F 305, the managing unit 311 notifies the mirror creating/deleting unit 326 of a creation instruction of the mirror instance 131 (step S611), and waits for a notification that the mirror instance 131 is created.

The mirror creating/deleting unit 326 that receives the creation instruction creates the mirror instance 131 (step S612) that starts mirror synchronization (step S613), and notifies the mirror creating/deleting unit 326 of the start of the mirror synchronization. The mirror creating/deleting unit 326 notifies the managing unit 311 of the start of the mirror synchronization.

The managing unit 311 that receives the notification of the start of the mirror synchronization instructs the VM server 103 to create and start up the destination virtual computer 122 (step S614), and notifies the synchronization monitoring unit 327 of a synchronization monitoring instruction (step S615). The synchronization monitoring unit 327 that receives the notification keeps checking whether the mirror synchronization is completed (step S616) until the completion of the mirror synchronization, that is, until all of the copy flags in the synchronization management table 331 become "COPIED". Upon the completion of the mirror synchronization, the synchronization monitoring unit 327 notifies the managing unit 311 of a completion report of the synchronization (step S617).

The managing unit 311 that receives the notification instructs the switching unit 329 to switch the storage mode (step S618). The switching unit 329 switches the storage mode from the first storage mode to the second storage mode.

After the switching, the managing unit 311 notifies the mirror creating/deleting unit 326 of a delete instruction of the mirror instance 131 (step S619). The mirror creating/deleting unit 326 that receives the notification deletes the mirror instance 131 (step S620), and notifies the managing unit 311 of the completion of the deletion. The managing unit 311 that receives the notification cuts the access to the source block I/F 305 (step S621), thereby ending the migration process.

Figure 7:
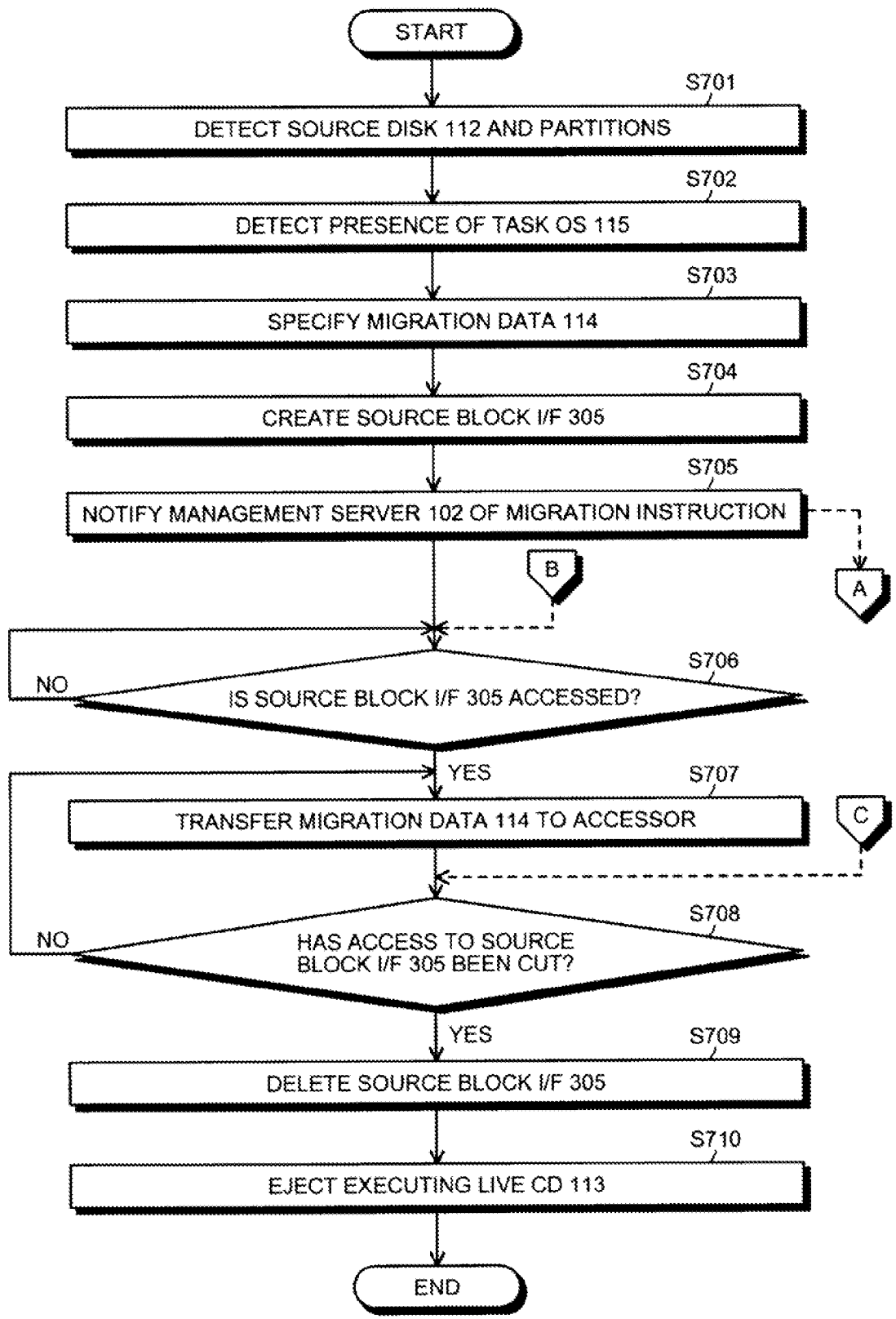
FIG. 7 is a flowchart of an example of a source-side process in the migration process.
Figure 8:
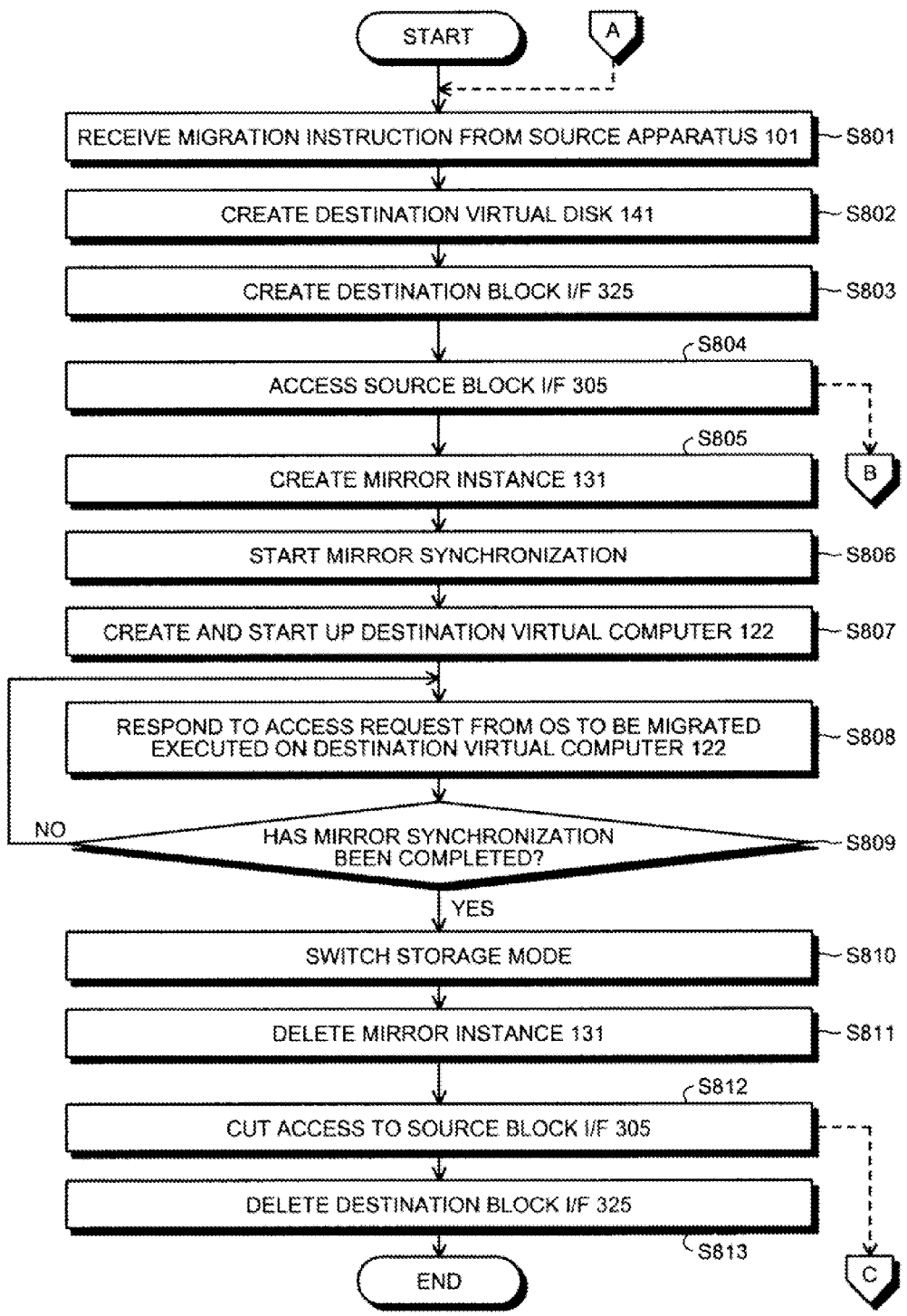
FIG. 8 is a flowchart of an example of a destination-side process in the migration process.

FIGS. 7 and 8 are flowcharts of operations of the source apparatus 101, the management server 102, and the storage server 104 that execute the sequence depicted in FIG. 6. A source-side process executed by the source apparatus 101 in the migration process is described with reference to FIG. 7, and a destination-side process executed by the management server 102 and the storage server 104 in the migration process is described with reference to FIG. 8.

FIG. 7 is a flowchart of an example of the source-side process in the migration process. After the source apparatus 101 is shut down, the live OS 111 is started up from the migration executing program live CD 113 in the source apparatus 101 to execute the migration process.

The source apparatus 101 detects the source disk 112 and partitions in the source disk 112 (step S701), and detects the presence of the task OS 115 in the source disk 112 or a partition of the source disk 112 (step S702). The source apparatus 101 specifies the migration data 114 that include the task OS 115 (step S703). For example, as depicted in FIG. 5, the source apparatus 101 specifies data stored in a partition(s) selected from the list of partitions displayed on the display of the specifying terminal 306 as the migration data 114.

The source apparatus 101 creates the source block I/F 305 (step S704) and notifies the management server 102 of a migration instruction (step S705). The source apparatus 101 determines whether the source block I/F 305 is accessed (step S706) by the destination block I/F 325 as described later at step S804 of FIG. 8. If the source block I/F 305 is not accessed (step S706: NO), the source apparatus 101 executes step S706 again after a given time period has passed.

If the source block I/F 305 is accessed (step S706: YES), the source apparatus 101 transfers the migration data 114 to the accessor in response to a request from the mirroring unit 332 (step S707), and determines whether the access to the source block I/F 305 is cut (step S708). If the access is not cut (step S708: NO), the source apparatus 101 executes step S707. If the access is cut (step S708: YES) by the destination block I/F 325 as described later at step S812 of FIG. 8, the source apparatus 101 deletes the source block I/F 305 (step S709). The source apparatus 101 ejects the migration executing program live CD 113 (step S710) and turns off the source apparatus 101, thereby ending the source-side process in the migration process.

If only one source disk 112 having only one partition is detected at step S701, the task OS 115 is present on the detected one partition. Thus, the source apparatus 101 may transfer the partition as the data to be migrated without checking the presence of the task OS 115 on the partition.

FIG. 8 is a flowchart of an example of the destination-side process in the migration process. The destination-side process is executed upon reception of the migration instruction from the source apparatus 101 notified at step S705. The management server 102 receives the migration instruction from the source apparatus 101 (step S801), and instructs the storage server 104 by the managing unit 311 to create the destination virtual disk 141 (step S802). Thus, the storage server 104 secures the destination storage area. Step S802 and subsequent steps (except step S807) are described to be executed by the storage server 104 since these steps are executed by the storage server 104 in accordance with instructions from the management server 102.

After creating the destination virtual disk 141, the storage server 104 creates the destination block I/F 325 (step S803), accesses the source block I/F 305 (step S804), creates the mirror instance 131 (step S805), and starts mirror synchronization (step S806).

After the start of the mirror synchronization, the management server 102 causes the VM server 103 by the managing unit 311 to create and start up the destination virtual computer 122 (step S807). After the start-up of the destination virtual computer 122, the storage server 104 responds to an access request from the OS to be migrated executed on the destination virtual computer 122 (step S808). Specifically, the storage server 104 notifies the mirroring unit 332 of the access request issued through the storage interface 328, and notifies the OS to be migrated of a response from the mirroring unit 332 through the storage interface 328.

The storage server 104 checks whether the mirror synchronization is completed (step S809). If the mirror synchronization is not completed (step S809: NO), the storage server 104 executes step S808.

If the mirror synchronization is completed (step S809: YES), the storage server 104 switches the storage mode (step S810), deletes the mirror instance 131 (step S811), cuts the access to the source block I/F 305 (step S812), and deletes the destination block I/F 325 (step S813), thereby ending the destination-side process in the migration process.

As described above, the migration system 100 according to the present embodiment can execute a migration process using postcopy even if the migration control unit 301 is not installed in the source apparatus 101. Next, an example of a conventional technology in which a migration control unit is installed in a task OS is described with reference to FIG. 9.

Figure 9:
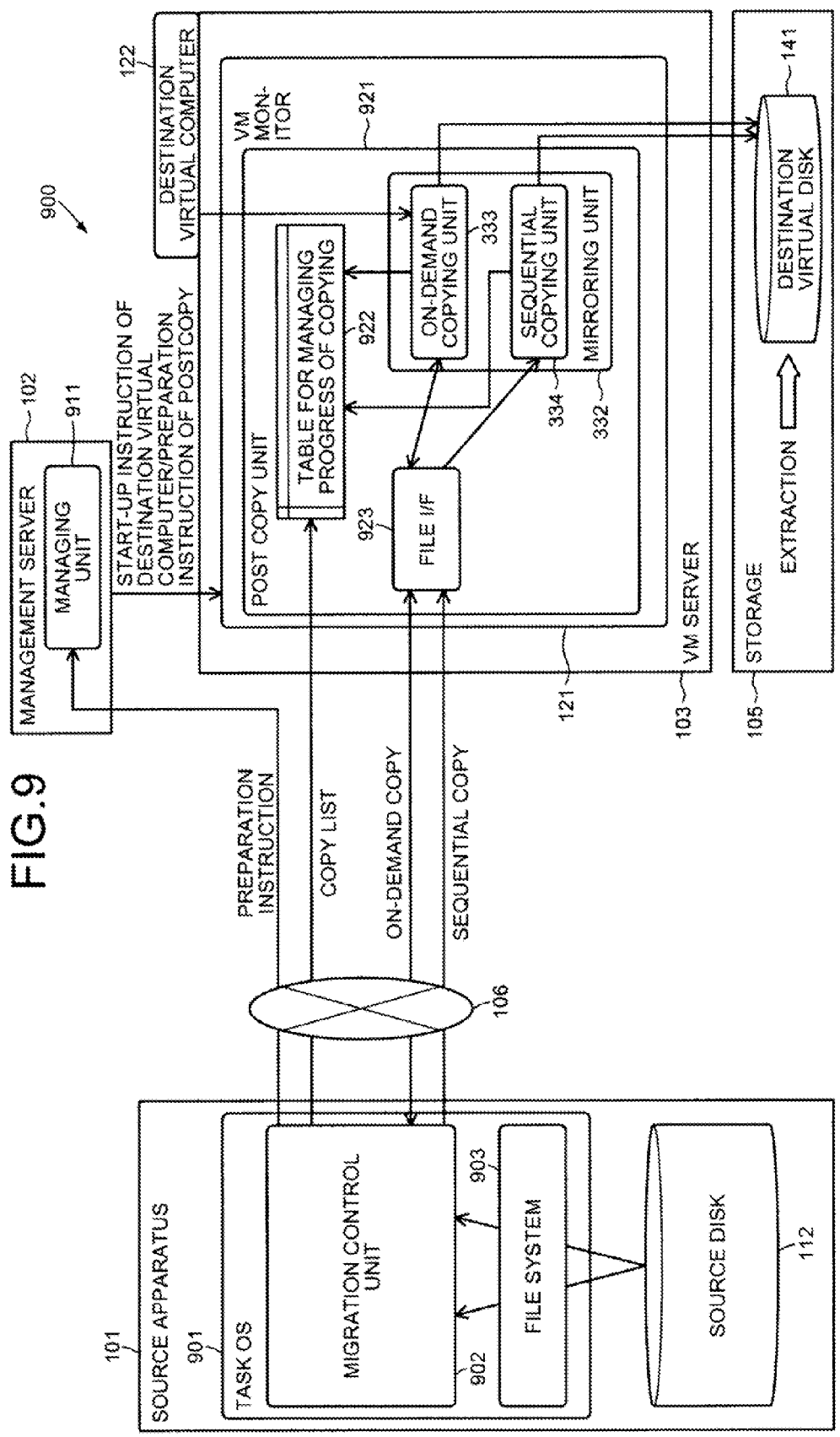
FIG. 9 is a schematic of an example of a migration process executed by a migration system 900 in which a migration control unit is installed in a task OS.

FIG. 9 is a schematic of an example of a migration process executed by a migration system 900 in which the migration control unit is installed in the task OS. Hardware and software of the migration system 900 equivalent to those of the migration system 100 according to the present embodiment are assigned the same signs, and description thereof is omitted. The conventional migration system 900 includes the source apparatus 101, the management server 102, the VM server 103, and the storage 105 that are connected by the network 106.

The source apparatus 101 includes the source disk 112 that includes a task OS 901 that has started up the source apparatus 101 and includes a migration control unit 902 and a file system 903. The management server 102 includes a managing unit 911. The VM server 103 includes the VM monitor 121 and the destination virtual computer 122. The VM monitor 121 includes a post copy unit 921 that includes a table 922 for managing the progress of copying, a file I/F 923, and the mirroring unit 332.

The mirroring unit 332 includes the on-demand copying unit 333 and the sequential copying unit 334. The migration system 900 includes, as storage areas accessible to software depicted in FIG. 9, the source disk 112 in the source apparatus 101 and the destination virtual disk 141 in the storage 105.

The task OS 901 is an OS included in the migration data 114, and in which the migration control unit 902 that controls the destination side in the migration process is installed in advance. The file system 903 is software that manages the source disk 112.

The managing unit 911 manages apparatuses on the destination side in the migration process. The post copy unit 921 is a function for postcopy. The table 922 stores the progress of copying. The file I/F 923 communicates with the migration control unit 902 via the network 106, and is accessed by the mirroring unit 332 on a file-by-file basis.

The migration control unit 902 notifies the managing unit 911 of a preparation instruction of the migration process, and notifies the post copy unit 921 of a copy list created by searching the file system 903. The post copy unit 921 that receives the notification reflects the copy list to the table 922. The migration control unit 902 notifies the managing unit 911 of a start-up instruction of the destination virtual computer and a preparation instruction of postcopy.

The management server 102 that receives the notification causes the VM server 103 to start up the destination virtual computer 122, and causes the sequential copying unit 334 to execute a sequential copy at the same time, thereby ending the migration process. If an access request is received from the destination virtual computer 122 during the migration process, the management server 102 causes the on-demand copying unit 333 to copy a file(s) corresponding to the access request, thereby responding to the access request.

As described above, the migration executing program, the migration executing apparatus, and the migration method according to the first embodiment start up the source apparatus from a live CD that includes a migration module for postcopy, and cause the source apparatus to execute the migration process to the destination apparatus. Thus, the migration system can add-on the migration process of computer environment using postcopy without changing an existing computer environment/VM monitor. In contrast, as depicted in FIG. 9, the conventional migration system installs the migration control unit in advance in the task OS to be migrated, and thus is difficult to be applied to an existing computer environment without the function of postcopy.

The migration system according to the first embodiment may set the unit of transfer of the data to be migrated to a block, and transfer the data to the destination apparatus. Thus, the migration system need not to create the copy list created for a copy on a file-by-file basis, thereby reducing the time required for the migration (the creation of the copy list takes time if the data to be migrated include a large number of files, and thus increases the time required for the migration).

The migration system according to the first embodiment performs copying on a block-by-block basis, and thus can perform copying irrespective of the type of the task OS to be migrated and/or the type of the file system of the task OS. Further, the data size of the synchronization management table managed according to block can be smaller than that of the table for managing the progress of copying, managed according to file. The data size can be reduced in particular when the synchronization management table is represented by a bit sequence.

If the source apparatus includes only one storage area other than the migration executing program live CD, the migration system according to the first embodiment may transfer the storage area to the destination apparatus as the data to be migrated. Thus, the migration system need not to detect for each disk/partition where an OS is present, thereby reducing the time required for the migration process.

If a write request to the migration data 114 is issued during the migration process, the migration system 100 according to the first embodiment writes data into the destination virtual disk 141 as well as the source disk 112 by the mirror instance 131. In contrast, the migration system 100 according to a second embodiment avoids writing to the source disk 112.

Figure 10:
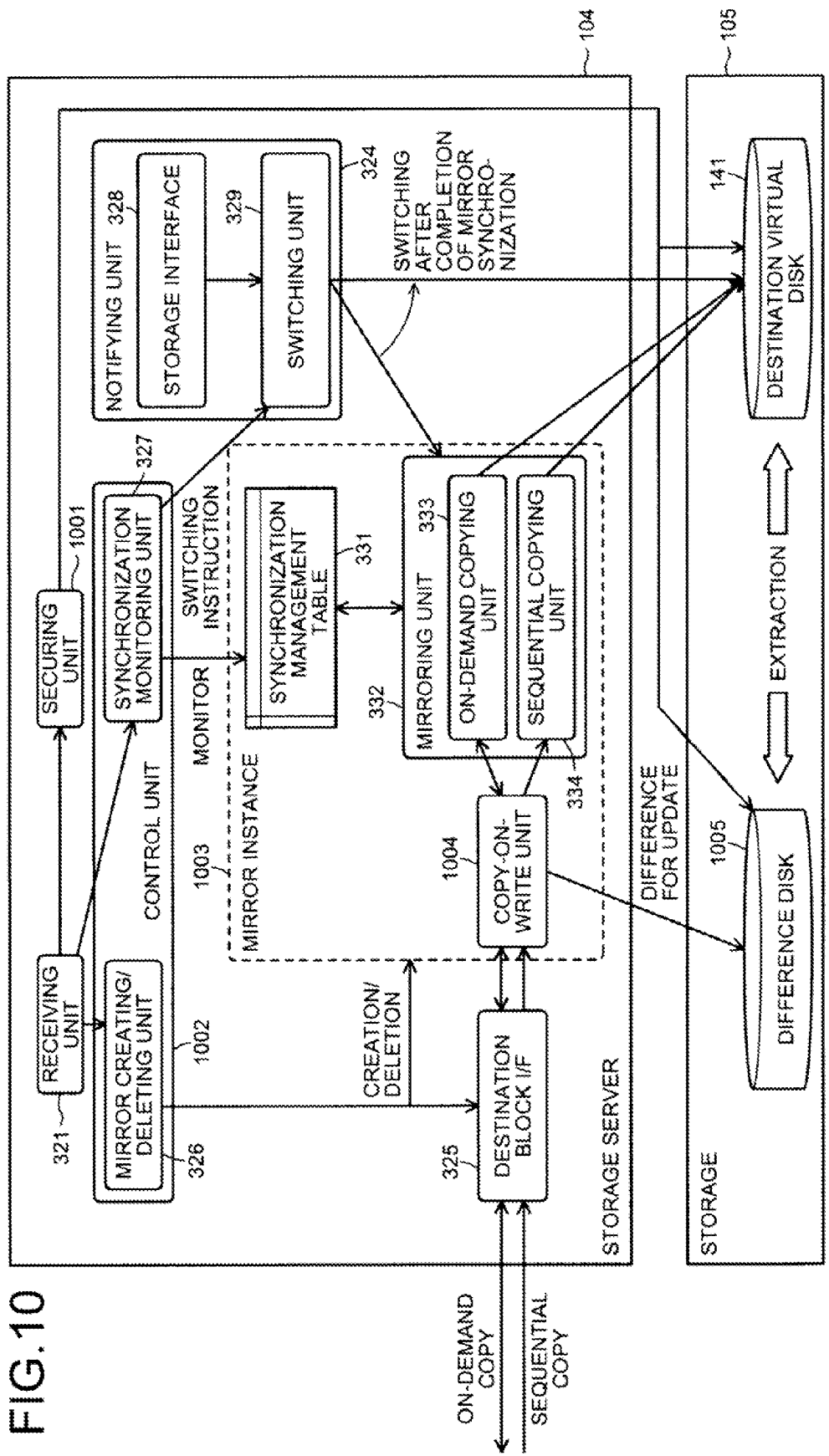
FIG. 10 is a functional block diagram of the migration system 100 according to a second embodiment.

FIG. 10 is a functional block diagram of the migration system 100 according to the second embodiment. In the migration system 100 depicted in FIG. 10, the source apparatus 101, the management server 102, and the VM server 103 having the same functions as those of the first embodiment are omitted, and only the storage server 104 and the storage 105 having different functions according to the second embodiment are depicted.

When a migration instruction is received, a securing unit 1001 secures the destination storage area by the securing unit 322 according to the first embodiment and further secures other storage area different from the destination storage area in the storage areas of the destination apparatus. For example, the securing unit 1001 extracts, as the other storage area, a difference disk 1005 for which a new LUN different from the LUN set for the destination virtual disk 141 is set from the storage pool in the storage 105.

If a write request to the migration data 114 is issued by the OS to be migrated during the synchronization by the mirroring unit 332, the control unit 1002 controls the mirroring unit 332 to change the writing to the source storage area to a writing to the other storage area. If a read request is issued, the control unit 1002 controls the mirroring unit 332 to provide data in the source storage area combined with data in the other storage area as the result of the reading from the source storage area.

Specifically, when the mirror creating/deleting unit 326 creates the mirror instance 1003, the control unit 1002 sets an identifier indicating a copy-on-write unit 1004 is to be included and the difference disk 1005 functioning as the other storage area as command line arguments. Thus, the mirror instance 1003 is created to include the copy-on-write unit 1004.

The mirror instance 1003 includes the copy-on-write unit 1004 as well as the synchronization management table 331 and the sequential copying unit 334. The storage 105 includes the difference disk 1005 as well as the destination virtual disk 141.

The difference disk 1005 stores difference data written by the copy-on-write unit 1004 when a write process is executed by the copy-on-write unit 1004. Similar to the destination virtual disk 141, the difference disk 1005 is one virtual disk having a LUN different from the LUN of the destination virtual disk 141 in the storage pool configured by physical disks in the storage 105. The difference disk 1005 may store all data of a block(s) to be written or may store, among data of a block(s) to be written, only the data that is different from that of the block(s) in the source disk 112.

If a write request to the migration data 114 is issued during mirror synchronization in the migration system 100 having these functions, the copy-on-write unit 1004 writes a difference resulting from the writing into the difference disk 1005, without writing into the source disk 112. Upon completion of the mirror synchronization, the storage server 104 deletes the difference disk 1005 by releasing the LUN set for the difference disk 1005.

Figure 11:
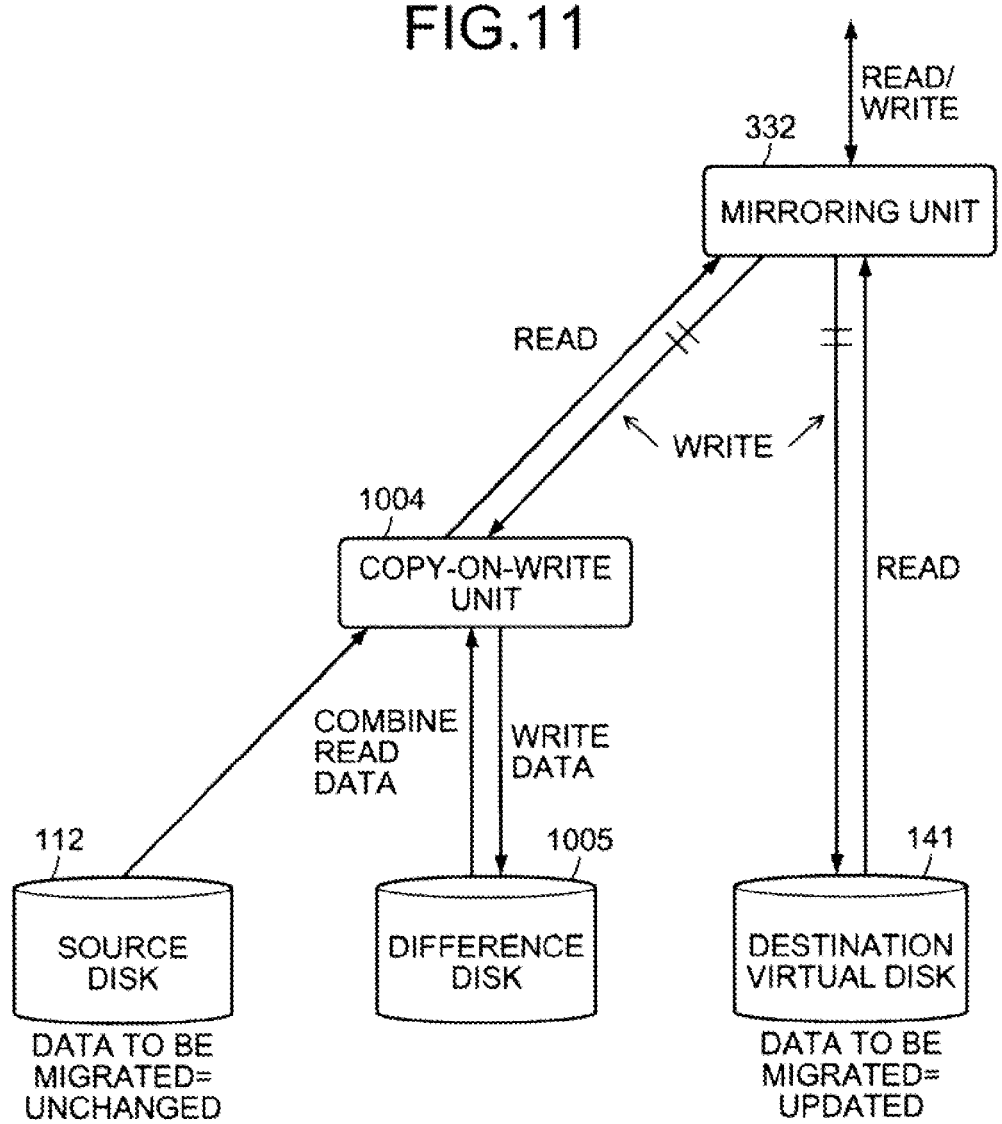
FIG. 11 is a schematic of an example of an operation of a copy-on-write unit 1004.

FIG. 11 is a schematic of an example of an operation of the copy-on-write unit 1004. Upon reception of a read/write request from/to the migration data 114 from the destination virtual computer 122, the mirroring unit 332 notifies the destination virtual disk 141 and the copy-on-write unit 1004 of the read/write request. If a write request to the migration data 114 is received, the copy-on-write unit 1004 writes data into the difference disk 1005 without writing into the source disk 112.

If a read request from the migration data 114 is received, the copy-on-write unit 1004 determines whether a block to be read is stored in the difference disk 1005. If so, the copy-on-write unit 1004 reads the block from the difference disk 1005, and if not, the copy-on-write unit 1004 reads the block from the source disk 112.

If the difference disk 1005 stores therein, among the data of the block, only the difference data from the block in the source disk 112, the copy-on-write unit 1004 combines the result of reading from the source disk 112 and that from the difference disk 1005. For example, if the block size is 512 bytes and the difference disk 1005 stores only 4 bytes from the top of the block, the copy-on-write unit 1004 combines 512 bytes from the block of the source disk 112 and 4 bytes from the difference disk 1005 such that the former is overwritten by the latter, and notifies the mirroring unit 332 of the result of the combination.

A flowchart of a migration process according to the second embodiment is described next. The migration process is the same as those depicted in FIGS. 7 and 8 except step S802, and thus description thereof is omitted. At step S802 the storage server 104 creates the destination virtual disk 141 and the difference disk 1005.

Flowcharts of the write process and the read process executed by the copy-on-write unit 1004 are described next with reference to FIGS. 12 and 13. These processes are executed by the storage server 104 using the function of the copy-on-write unit 1004. For easy understanding, in FIGS. 12 and 13 the processes are described to be executed by the copy-on-write unit 1004. The write process and the read process depicted in FIGS. 12 and 13 are executed at step S808 of FIG. 8.

FIG. 12 is a flowchart of an example of the write process executed by the copy-on-write unit 1004. The copy-on-write unit 1004 receives a write request from the mirroring unit 332 (step S1201), and determines whether the block to be written is stored in the difference disk 1005 (step S1202). If not (step S1202: NO), the copy-on-write unit 1004 reads the block from the source disk 112 (step S1203). If so (step S1202: YES), the copy-on-write unit 1004 reads the block from the difference disk 1005 (step S1204). The copy-on-write unit 1004 writes or updates the read block in the memory of the storage server 104 (step S1205), and writes the written or updated block into the difference disk 1005 (step S1206).

The copy-on-write unit 1004 determines whether all writing for the request is completed (step S1207). If not (step S1207: NO), the copy-on-write unit 1004 executes step S1202. If so (step S1207: YES), the copy-on-write unit 1004 notifies the mirroring unit 332 of a response indicating the completion of the writing (step S1208), thereby ending the write process.

FIG. 13 is a flowchart of an example of the read process executed by the copy-on-write unit 1004. The copy-on-write unit 1004 receives a read request from the mirroring unit 332 (step S1301), and determines whether the block to be read is stored in the difference disk 1005 (step S1302). If not (step S1302: NO), the copy-on-write unit 1004 reads the block from the source disk 112 and notifies the mirroring unit 332 of the block (step S1303). If so (step S1302: YES), the copy-on-write unit 1004 reads the block from the difference disk 1005 and notifies the mirroring unit 332 of the block (step S1304).

The copy-on-write unit 1004 determines whether all reading for the request is completed (step S1305). If not (step S1305: NO), the copy-on-write unit 1004 executes step S1302. If so (step S1305: YES), the copy-on-write unit 1004 notifies the mirroring unit 332 of a response indicating the completion of the reading (step S1306), thereby ending the read process.

As described above, the migration executing program, the migration executing apparatus, and the migration method secure the other storage area different from the destination storage area in the storage areas of the destination apparatus, write data into the other storage area, and combines data in the source storage area and data in the other storage area when the data are read.

Thus, the migration system according to the second embodiment does not send a write request to the source disk, thereby reducing traffic on the network and a waiting time for response to the write request. The time required for migration can be significantly reduced by reducing the traffic, in particular if the network is a WAN having a slow transmission speed. Since the migration system according to the second embodiment does not write into the source disk, the data to be migrated are maintained intact from the state at the time of the migration. For example, if an error occurs in the destination apparatus after the completion of the migration process, the migration system can execute the migration process again using the maintained data.

The migration method described in the present embodiment may be implemented by executing a prepared program on a computer such as a personal computer and a workstation. The program is stored on a computer-readable medium such as a hard disk, a flexible disk, a CD-ROM, an MO, and a DVD, read out from the recording medium, and executed by the computer. The program may be distributed through a network such as the Internet. However, the computer-readable medium does not include a transitory medium such as a propagation signal.

According to an aspect of the embodiments, computer environment can be migrated using postcopy.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A migration system that includes a source apparatus and a destination apparatus, wherein
the source apparatus:
detects by a first central processing unit (CPU) included in the source apparatus, a first operating system to be migrated to the destination apparatus when the source apparatus configured to store the first operating system to be migrated to the destination apparatus is started up by a second operating system stored in a non-transitory computer-readable recording medium attachable to and detachable from the source apparatus; and
transfers by the first CPU and when the first operating system is detected, data to be migrated that are stored in a source storage area of the source apparatus and include at least the first operating system to the destination apparatus; and
the destination apparatus:
receives by a second central processing unit (CPU) included in the destination apparatus and from the source apparatus, a migration instruction of the data to be migrated;
secures by the second CPU and in a storage area of the destination apparatus, when the migration instruction is received, a destination storage area accessible to the first operating system to be migrated;
controls by the second CPU and when the destination storage area is secured, a mirroring device such that the data to be migrated are synchronized between the source storage area and the destination storage area; and
switches by the second CPU and from the mirroring device to the destination storage area, a destination of an access request from the first operating system to be migrated to the data to be migrated, when synchronization by the mirroring device is completed, wherein the destination apparatus is configured to:
secure, when the migration instruction is received, an other storage area different from the destination storage area in the storage area of the destination apparatus;
control, when a write request to the data to be migrated is issued by the first operating system to be migrated during synchronization by the mirroring device, the mirroring device to change a writing to the source storage area to a writing to the other storage area; and
control, when a read request to the data to be migrated is issued by the first operating system to be migrated during the synchronization by the mirroring device, the mirroring device to provide data in the source storage area combined with data in the other storage area as a result of a reading from the source storage area.

* * * * *